United States Patent [19]

Van Appledorn

[11] Patent Number: 4,460,324

[45] Date of Patent: Jul. 17, 1984

[54] SHOT CYLINDER CONTROLLER FOR DIE CASTING MACHINES AND THE LIKE

[75] Inventor: William Van Appledorn, Holland, Mich.

[73] Assignee: Prince Corporation, Holland, Mich.

[21] Appl. No.: 256,956

[22] Filed: Apr. 23, 1981

[51] Int. Cl.[3] .......................... B29F 1/04; F15B 13/16; F15B 11/18

[52] U.S. Cl. .................................... 425/166; 425/557; 251/63.4; 251/63.5; 91/167 R; 91/361

[58] Field of Search .................... 251/63.5, 63.4, 61.2; 91/167 R, 167 A, 361; 235/200 ME; 425/166, 557

[56] References Cited

U.S. PATENT DOCUMENTS

| | | | |
|---|---|---|---|
| 3,072,146 | 1/1963 | Gigeski | 91/167 R |
| 3,100,083 | 8/1963 | Wardrup | 251/61.2 |
| 3,229,588 | 1/1966 | Cgernek | 91/167 R |
| 3,242,820 | 3/1966 | Brandstadter | 91/167 R |
| 3,533,596 | 10/1970 | Doume | 91/167 R |
| 3,835,750 | 9/1974 | Dunne | 91/167 R |
| 3,911,790 | 10/1975 | Gaitten | 235/201 ME |

FOREIGN PATENT DOCUMENTS

| | | | |
|---|---|---|---|
| 513477 | 10/1939 | United Kingdom | 91/167 R |
| 267279 | 7/1970 | U.S.S.R. | 91/167 R |

OTHER PUBLICATIONS

Publication, "Cartridge Valve Concepts", Chapter Entitled Application: Die Casting, Sperry-Vickers, Troy, Michigan, Publication Date Unknown.

*Primary Examiner*—Paul E. Maslousky

*Attorney, Agent, or Firm*—Price, Heneveld, Huizenga & Cooper

[57] ABSTRACT

A shot cylinder controller for injection molding machines comprises a valve connected with one side of the shot cylinder and including a valve head which is movable with respect to a seat. The valve head is connected with at least two, lineally extensible actuators, interconnected in an end-to-end relationship. The actuators are independently extended and retracted, whereby selective manipulation of the actuators varies the position of the valve head, and thereby controls the extension of the shot cylinder and regulates the speed of die injection.

35 Claims, 10 Drawing Figures

SHOT CYLINDER CONTROLLER FOR DIE CASTING MACHINES AND THE LIKE

BACKGROUND OF THE INVENTION

The present invention relates to injection molding machines, and in particular, to a mechanical shot cylinder controller for die casting machines and the like.

Injection molding machines for plastics or die casting have hydraulic cylinders to inject flowable material into a die. A control valve is typically connected between the power side of the shot cylinder and an accumulator, which provides a source of high pressure hydraulic fluid. The control valve is manipulated to govern the operation of the shot cylinder. As is well known and appreciated in the die casting industry, it is particularly important to precisely control the speed at which the ram or piston in the shot cylinder extends, and to be able to vary this speed throughout the stroke of the cylinder to insure that the die is properly injected. It is generally preferred that die injection start rather slowly, and then speed up through an intermediate zone for die runner fill, and then the controlled, fast speed, which is maintained until the die is nearly completely full. Just prior to the end of the injection stroke, the shot ram is decelerated very suddenly to a slow speed to avoid high impact at the end of the cylinder stroke which can strain the die casting machine and/or cause the die to spit. Precise control of ram speed is quite important for proper gate velocity.

Heretofore, sliding-spool directional flow valves have been connected between the opposite sides of the shot cylinder in die casting machines to control the extension of the shot ram. However, multiple speed spool valves have a rather complex construction, and are not capable of quickly and accurately varying the extension speed of the shot ram. Such valves are also quite expensive, and difficult to repair.

Another arrangement for controlling shot ram extension is shown and described in the Vickers publication noted in the disclosure statement, wherein a four cartridge valve system is shown on page 105. The four cartridge valves are interconnected in a parallel arrangement, and are independently manipulated by four-way valves. The cartridge valves are of different sizes, and permit flow therethrough in amounts of 1-2-4-8, or any combination thereof. The Vickers cartridge valve system is located between the accumulator and the power or blind side of the shot cylinder, so that it restricts the flow of high pressure hydraulic fluid into the cylinder. This arrangement requires a complicated manifold system to pipe the hydraulic fluid to the four cartridge valves, and therefore substantially reduces the reaction speed of the system.

SUMMARY OF THE INVENTION

One aspect of the present invention is a novel controller for die casting machines, and the like, comprising a flow valve of the type having a body with a fluid passageway therethrough, and a movable throttling mechanism disposed in the passageway. The controller includes at least two, lineally extensible actuators which are interconnected in an end-to-end relationship, with a terminal one of the actuators attached to the throttling mechanism. The actuators can be independently extended and retracted, whereby selective manipulation of the actuators varies the position of the throttling mechanism in the passageway, and thereby controls fluid flow through the valve. Preferably, the actuators are binary, with only fully extended and fully retracted position, and each actuator has a different stroke length proportion with respect to each other in a 1-2-4-8 sequence. The controller and associated flow valve are particularly adapted for use in conjunction with die casting machines and are preferably connected on the rod side of the cylinder to regulate the flow of hydraulic fluid being exhausted from the shot cylinder.

The principal objects of the present invention are to provide a controller for plastic or metal injection molding machines, which has a very high reaction speed, and an uncomplicated construction. The controller includes a plurality of actuators interconnected in end-to-end relationship, and are binary in nature so that the valve can be very accurately opened and closed a predetermined distance. The valve head and seat are preferably shaped in accordance with the stroke length of the actuators, so that longitudinal movement of the valve head a certain distance from a given position results in a proportionate increase in fluid flow through the valve. The controller preferably manipulates a poppet-type valve, which is easy to repair, and has a long operating life.

These and other features, advantages, and objects of the present invention will be further understood and appreciated by those skilled in the art by references to the following written specification, claims, and appended drawings.

DETAILED DESCRIPTION OF THE PREFERRED EMBODIMENTS

Figure 1:
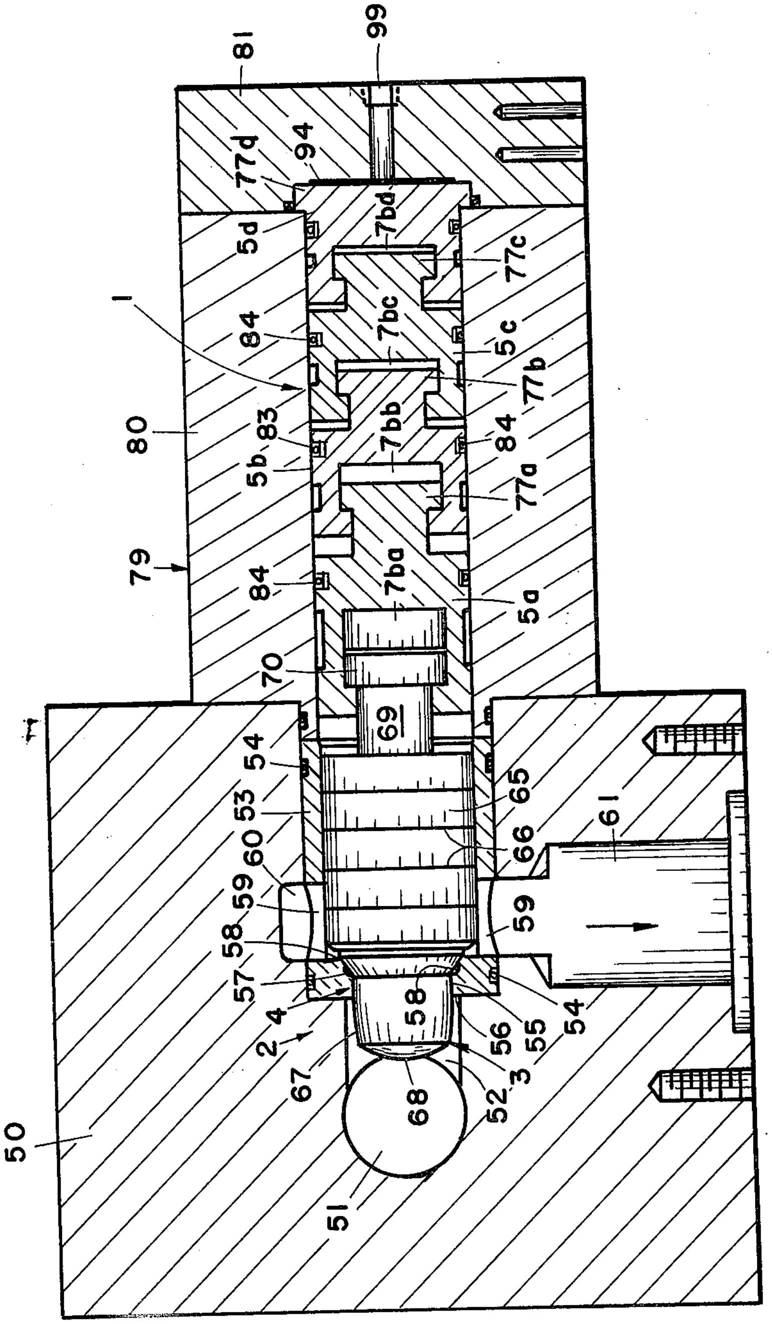
FIG. 1 is a cross-sectional view of a flow valve and controller therefor, embodying the present invention.

For purposes of description herein, the terms "upper", "lower", "right", "left", "rear", "front", "vertical", "horizontal", and derivatives thereof shall relate to the invention as oriented in FIGS. 1 and 4–7. However, it must be understood that the invention may assume various alternative orientations, and/or operate with different step sequences, except where expressly specified to the contrary.

The reference numeral 1 (FIG. 1) generally designates a controller for hydraulic valve 2, having a valve head 3 and seat 4. Controller 1 comprises at least two, lineally extensible actuators 5, interconnected in an end-to-end relationship. Actuators 5 can be independently extended and retracted, whereby selective manipulation of the actuators varies the position of valve head 3 with respect to seat 4, and thereby controls the clearance between head 3 and 4 and therefore fluid flow through valve 2. As illustrated in FIGS. 4–7, the controller-operated valve 2 is particularly adapted for use in conjunction with the shot cylinder 6 of a die casting machine 7 to control and vary die injection speed.

It is to be understood that although controller 1 and valve 2 are described herein in conjunction with a die casting machine, within the broader aspects of this invention the illustrated application is not intended to be limiting, and within such broader aspects the invention can be used in virtually any type of flow regulator. It should equally be understood that within narrower aspects of this invention, it is especially related to the combination of poppet check valve and shot cylinder for die casting machines since the combination is unique and provides a linear control in an unusual and unexpected way.

A fragmentary, schematic illustration of die casting machine 7 is shown in FIGS. 4–7, and comprises shot cylinder 6, an accumulator 11, and a multi-speed regulator or selector 12. Accumulator 11 has a conventional construction, and is schematically illustrated as a piston 13 slideably mounted in a cylinder 14. The blind or power side of cylinder 14 is communicated with the power side of shot cylinder 6 by a conduit 15, having a pilot operated check valve 16 therein. During die injection, accumulator 11 flows high pressure hydraulic fluid to the power side of shot cylinder 6, and extends the cylinder rod. Conduit 17 communicates the exhaust side of shot cylinder 6 with valve 2, which regulates flow therefrom to form a "meter out" type of ram controller.

Shot cylinder 6 comprises a housing 20 in which piston 21 is slidingly received. Piston 21 includes sealing means around the peripheral surface thereof, such as rings 22. A rod 23 is attached to that side of piston 21 opposite from conduit 15, and extends through the associated end of housing 20 with a seal 24. The outermost end 25 of piston rod 23 is attached to a conventional plunger arrangement 110 which positively injects molten metal into the cavity 114 of die 111 comprised of the front platen 112 and rear platen 113. An indicator 26 is attached to rod 23 to determine the relative position of piston 21 in cylinder housing 20, and includes means for relating this information to speed selector 12. Indicator 26 may comprise any conventional, suitable measuring mechanism, such as limit switches or the like, and in the illustrated example, includes an upstanding arm 27 attached to the outer end 25 of rod 23, with a linear transducer 28 having one end fixed, and the other end attached to arm 27. Transducer 28 generates an electrical signal corresponding to the position of piston 21 in housing 20, and transmits this signal through electrical conduit 29 to speed selector 12.

The transducer signal received by speed selector 12, extends and retracts actuators 5 in accordance with the desired speeds of shot cylinder 6 as it extends during die injection. It is to be understood that any suitable means for controlling the operation of actuators 5 in response to the position of piston 21 can be used. In the illustrated example, selector 12 comprises a digital electrical instrumentation system, the operation of which is described in greater detail below.

The stroke of the illustrated piston 21 is divided into five zones, comprising slow 32, intermediate 33, fast 34, impact 35 and follow-through 36. The location of the beginning and ending points for each zone is variable, and preselected in accordance with the type of metal, die casting machine and die being used. In this example, the length of each of these zones can be varied by manipulating digital selectors 37 through 41 respectively. Indicator lights 42 provide a visual display of the actual location of piston 21, and a graph 43 is scribed on the control panel to indicate ram speed (vertical axis) vs. piston position (horizontal axis). Speed selector 12 includes four variable potentiometers 44–47 for varying piston speed in the slow, intermediate, fast, and impact zones 32–35 respectively. The illustrated potentiometers 44–47 are digital in nature, and can select speeds in intervals of 1 from 0–30. The 1–30 scale of potentiometers 44–47 is arbitrary, and in this example, represents actual ram speeds in the range of 0–1000 feet per minute. Potentiometers 44–47 remotely operate controller 1 in the manner described below.

With reference to FIG. 1, valve 2 includes a valve body having an inlet 51 which communicates with valve seat 4 through a laterally extending passageway 52. In this example, valve seat 4 is formed in a sleeve 53, which is sealingly mounted in valve body 50 by O-rings 54. Valve seat 4 is located at the upstream end of sleeve 53, has a cylindrical surface 55 with a champfered forward edge 56, and an annularly grooved rear edge 57 which forms a circular rim 58 for purposes to be described in greater detail hereinafter. Sleeve 53 includes a plurality of radially extending apertures 59 located just downstream of valve seat 4, and communicate with an annularly shaped groove 60 and outlet passageway 61 in valve body 50.

Figure 3:
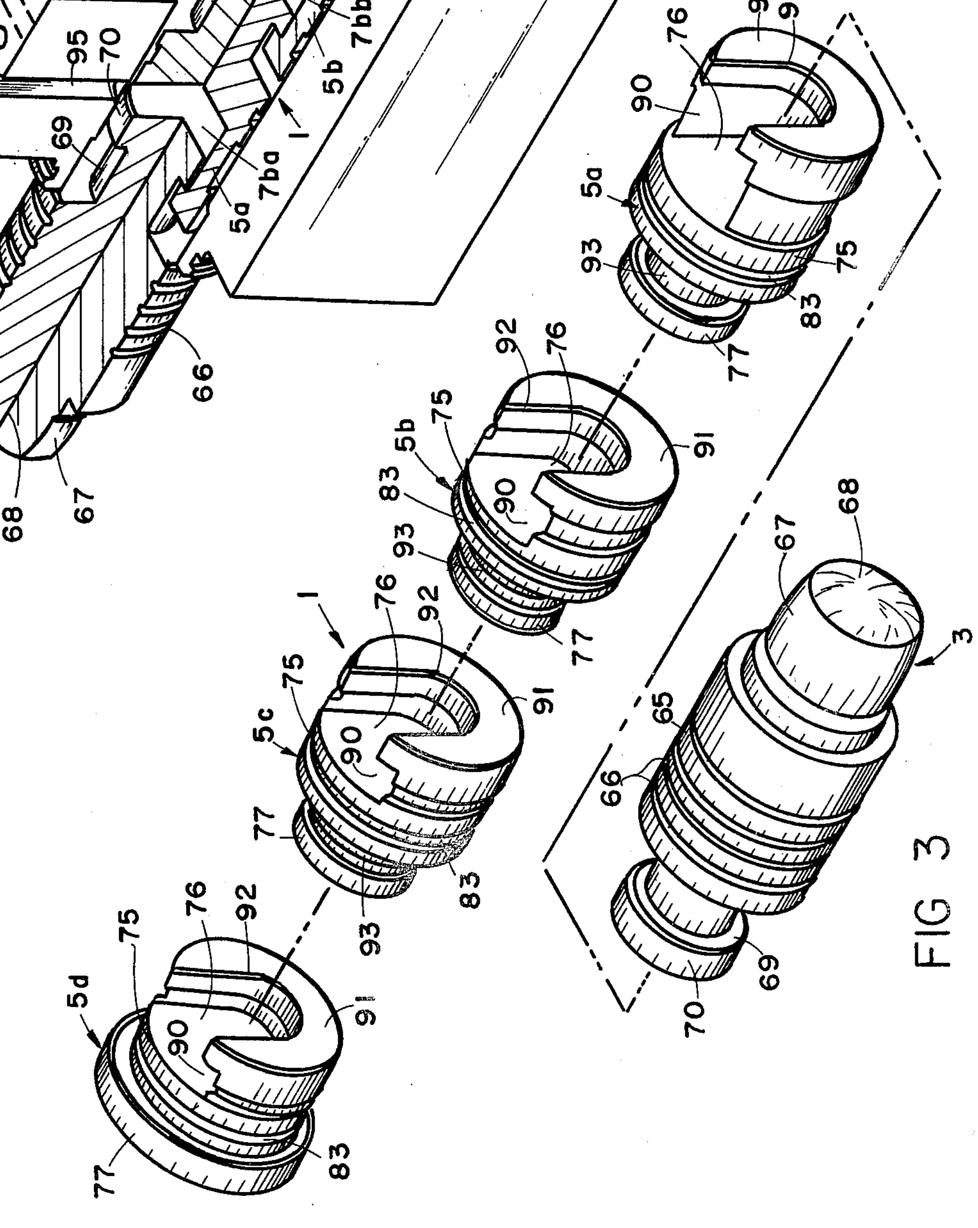
FIG. 3 is an exploded, perspective view of the controller.
Figure 3A:
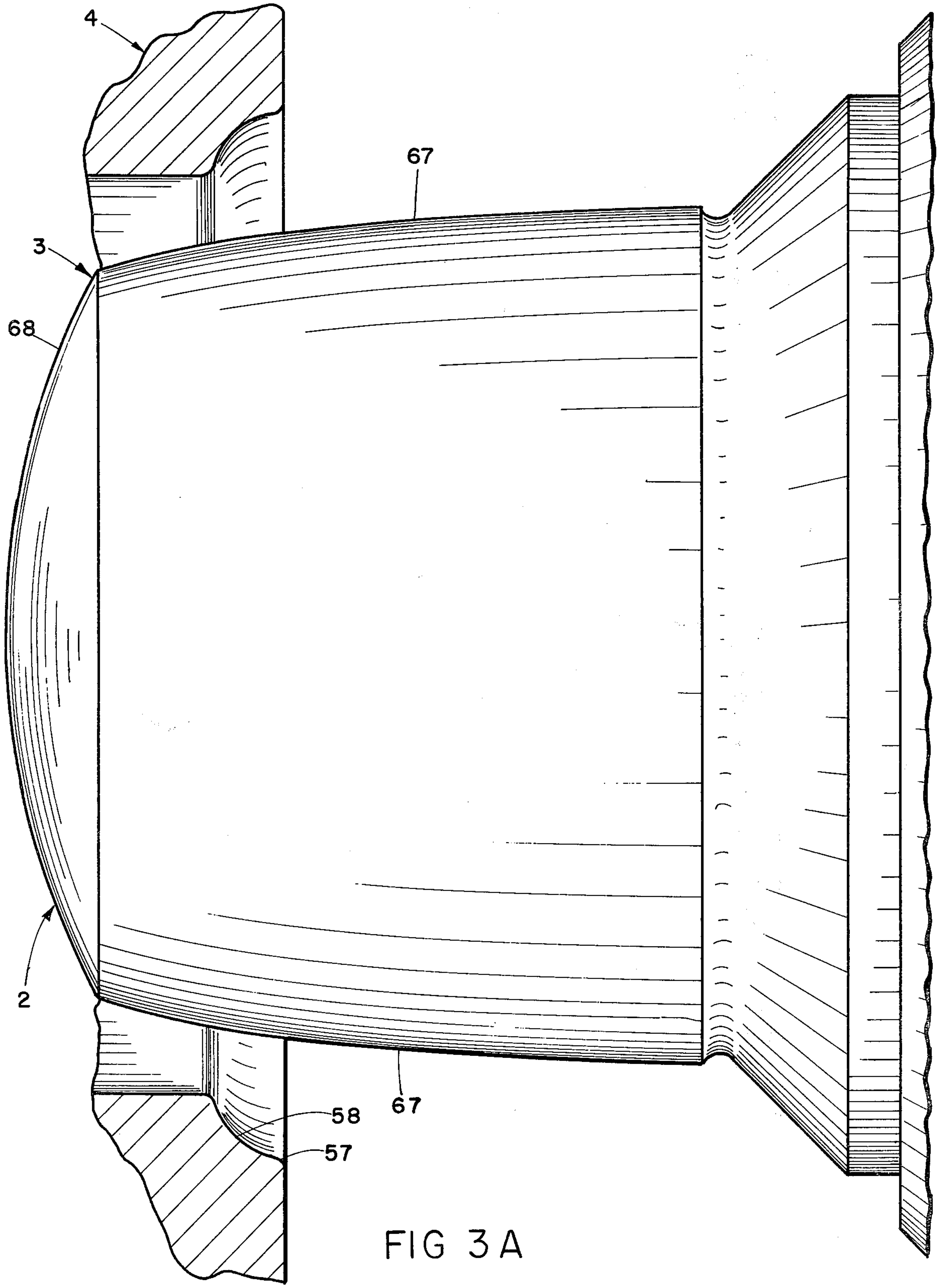
FIG. 3A is an enlarged, fragmentary, side elevational view of head and seat portions of the valve.
Figure 3B:
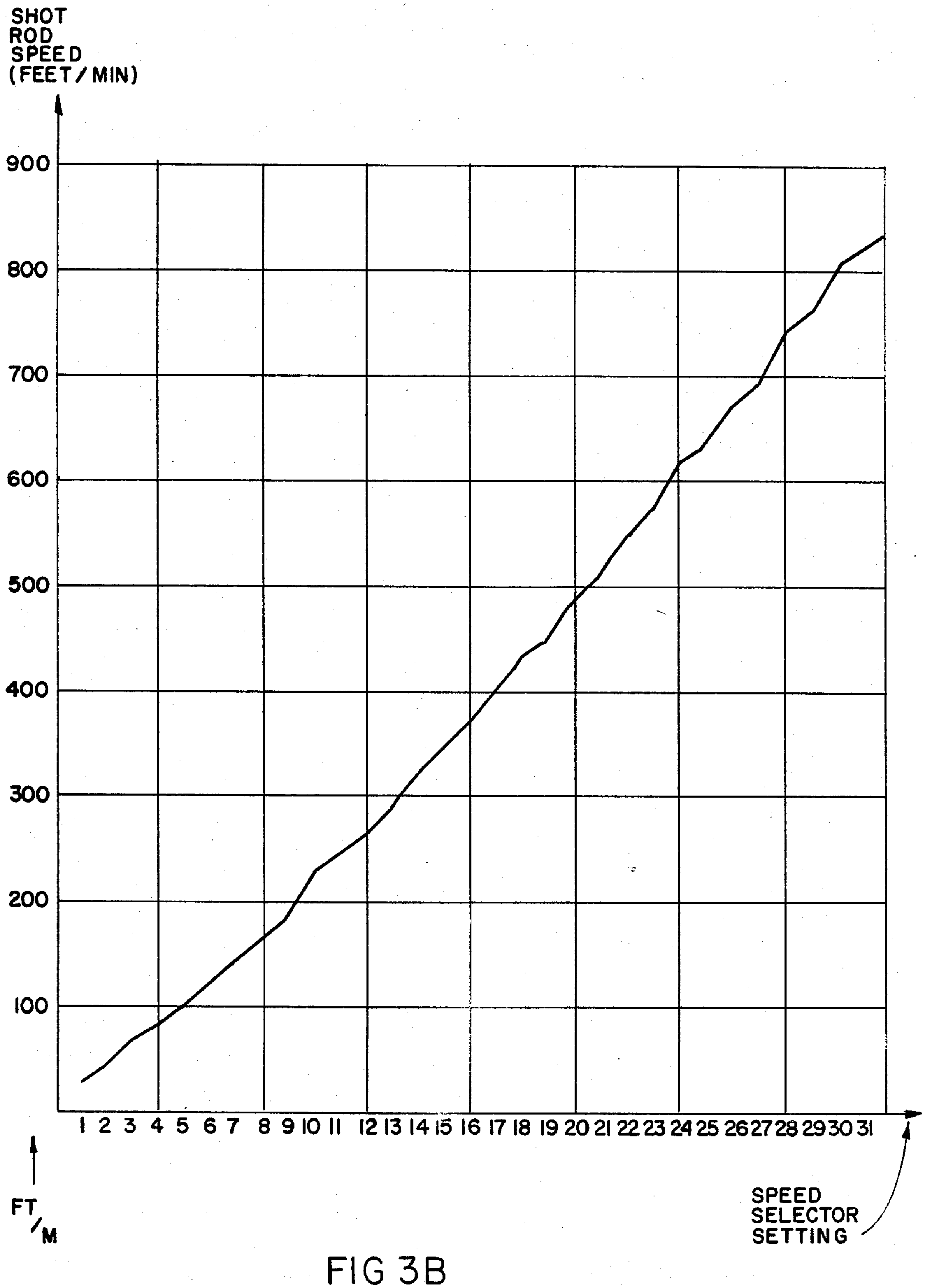
FIG. 3B is a graphical illustration of shot ram speed versus speed selector setting.

Valve head 3 has a generally cylindrically shaped body 65 which is telescopingly received in sleeve 53 and slides axially therein. Body portion 65 of valve head 3 includes a plurality of circumferentially extending grooves 66 spaced regularly along the length of body 65, and serve to prevent silting between the two surfaces. The downstream end of valve head body 65 includes a rearwardly extending stem or rod 69 having a piston 70 mounted on the terminal end thereof to form a portion of the forwardmost actuator 5, as described below. Valve head 3 is mounted on and projects outwardly from the upstream end of body 65, and has a somewhat cylindrical shape, with an arcuately tapered side wall 67, and a rounded end 68. Valve head 3 is axially aligned with seat 4 and inlet passageways 51 and 52, such that as valve head 3 is diverged from seat 4, an annular aperture is formed therebetween through which the hydraulic fluid flows. Preferably, valve side wall 67 and seat 4 are specially shaped so that longitudinal movement of valve head 3 away from seat 4 is directly and lineally proportional to the flow rate of hydraulic fluid through the valve, and hence the speed of shot ram 23. For example, with reference to FIG. 3A, if the speed selector setting is "4", valve head 3 is retracted from the fully closed position a distance in the nature of 0.187 inches, and the shot ram has a corresponding ram speed of approximately 85 feet per minute. If the speed selector setting is increased to "8", valve head 3 is shifted open an additional 0.187 inches from the first point (a total distance of 0.374 inches from the fully closed position), and the ram speed would be approximately 170 feet per minute. By opening valve head 3 another 0.187 inches, corresponding to a speed setting of "12" (a total distance of 0.561 inches from the fully closed position), the speed of shot ram 25 would increase to around 255 feet per minute. The shape of valve head 3 and seat 4 illustrated in FIG. 3A has been found to achieve the above described lineal relationship when used with hydraulic fluid as a shot cylinder controller.

Valve head 3 and seat 4 mate axially with a reciprocating motion, so as to form a poppet-type valve, wherein the plane of sealing is disposed generally perpendicular to the direction of valve head translation. Since the terminal end 68 of valve head 3 is located at the upstreammost end of the valve, the fluid flowing through the valve generates a force on the valve head which urges the same rearwardly. As described in greater detail below, this rearward force is used to collapse the actuators 5 when required, and facilitates very quick valve adjustment. This type of poppet valve arrangement permits use of a hardened valve head and seat, without greatly increasing the cost of manufacture.

Actuators 5 are longitudinally extensible, and are mounted in an end-to-end relationship, such that selective manipulation of the individual actuators opens valve 2 to a predetermined distance. In this example, each of actuators 5 (FIGS. 2-3) is hydraulically operated, and comprises a body 75 having a cylinder housing 76 disposed at one end thereof, and a piston 77 projecting from the other end of body 75. Each actuator body 75 has a generally cylindrical shape, and is slidingly mounted in a two-part housing 79, comprising a central portion 80 in which actuators 5 are telescoping received, and an end cap 81 detachably connected with central housing member 80 by means such as bolts 82. Each actuator body 75 has an annular groove 83 around the exterior surface thereof adjacent the downstream end of the body, with a seal 84 mounted therein. With reference to FIG. 2A, the illustrated seal 84 includes a base 85 with generally rectangular cross-section, and an arcuate bead 86 projecting outwardly therefrom. The cylinder housing 76 of each actuator body 75 includes a slot 90, which is large enough to receive therethrough a mating actuator piston 77. The forward face 91 of each actuator body 75 also includes a slot 92, which is slightly narrower than the piston slot 90, and shaped to closely receive the rod or stem portion 93 of an associated actuator piston 77 therein.

In the illustrated example, controller 1 comprises four individual actuators 5, with the piston portion 70 of valve head 3 shaped to mount in the cylinder 76 of the upstreammost actuator 5, and a cylinder cavity 94 formed in end cap 81 to receive the piston 77 of the downstreammost actuator. Since each actuator 5 is substantially similar to the other actuators, except as noted herein, the actuators and similar parts thereof are noted by the same corresponding reference numerals, except for the suffixes "a", "b", "c", and "d", which designate the particular actuator.

Preferably, actuators 5*a*-5*d* are binary, insofar as they have only a fully extended position, and a fully retracted position, with no intermediate operational positions therebetween. Also, each of the actuators 5*a*-5*c* preferably has a different stroke length, so as to achieve maximum variation in the positions which valve 2 may assume, with the stroke lengths proportioned with respect to each other in a 1-2-4-8-16 pattern or $1^2$ sequence. For example, in the illustrated structure, the stroke length of the actuator pistons are as follows:

| Piston | Stroke Length ± .005 |
|---|---|
| 77d | .047 |
| 77c | .094 |
| 77b | .188 |
| 77a | .376 |
| 70 | .752 |

This $1^2$ stroke sequence, in conjunction with the binary nature of actuators 5, provides an arrangement wherein valve 2 has thirty different open positions.

Figure 2:
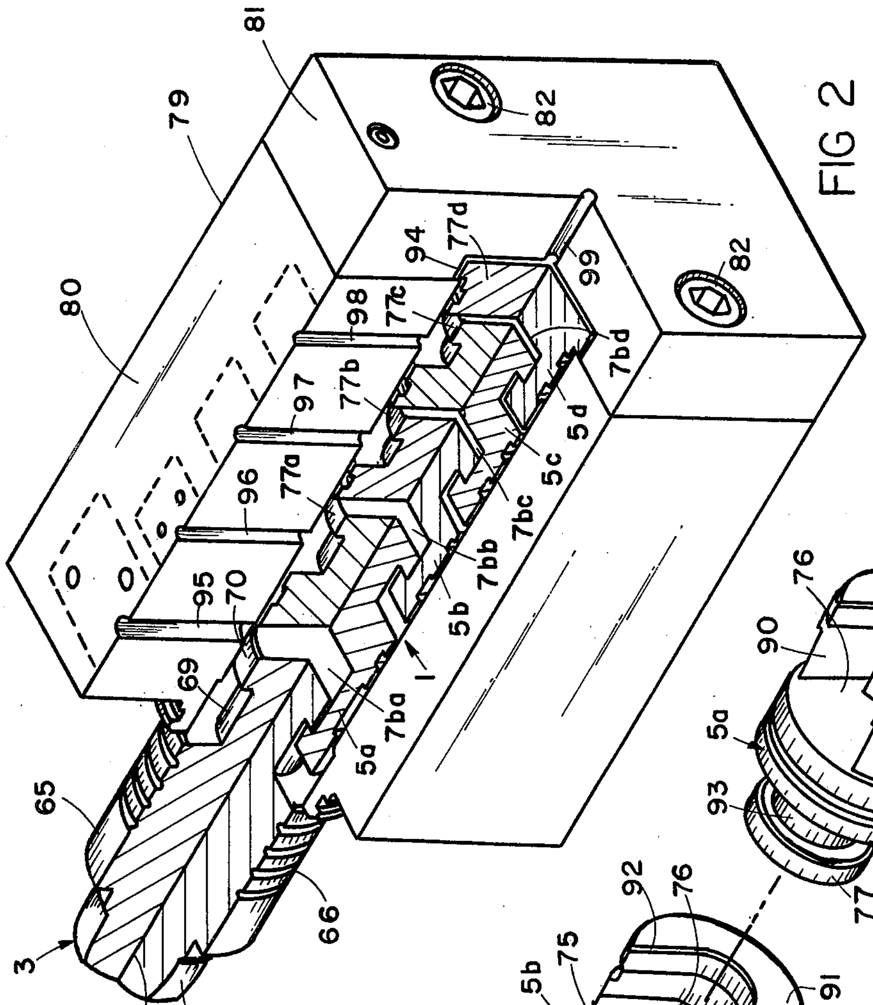
FIG. 2 is a perspective view of a rearward portion of the valve, having a section thereof broken away to reveal the controller.
Figure 2A:
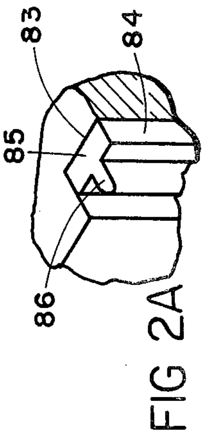
FIG. 2A is an enlarged, fragmentary view of an annular seal portion of the controller.

As best illustrated in FIG. 2, the central portion 80 of valve housing 79 includes four ports 95–98 which communicate with the cylinder portion 76 of actuators 5*a*-5*d* respectively. A fifth port 99 extends through housing end block 81 and communicates with the cylindrical cavity 94 therein. Each of the ports 95–98 includes a solenoid-operated, four-way, directional valve 100–104 respectively, schematically shown in FIGS. 4–7. One port of each valve 100–104 is selectively communicated with a high pressure manifold 105 which comprises a conduit having one end communicating with the power side of cylinder 6, and the opposite end communicating with the rod side of cylinder 6. Oppositely oriented check valves 106 and 107 are provided in manifold 105, on opposite sides of valve 100–104, such that the four-way valves are operated by the highest pressure existing on either side of cylinder 6. The other port of four-way valves 100–104 communicate with a return manifold 108, which in turn feeds exhausted, low pressure hydraulic fluid to reservoir 109. When the four-way valves 100–104 are in the through position (arrows parallel), actuator ports 95–99 are communicated directly with high pressure manifold 105, and extend the associated actuator piston. When four-way valves 100–104 are in the cross-over position (arrows crossed), actuator ports 95–99 are communicated with exhaust manifold 108. The fluid pressure and flow forces which act on the upstream end of valve head 3 quickly collapse the actuator pistons in the cross-over position. The solenoid controllers 110 on four-way valves 100–104 are electrically connected with speed selector 12, and can rapidly shift each individual valve in accordance with the speeds selected on potentiometers 44–47.

In operation, the die casting machine operator first determines the speed and type of injection which is desired for the selected job. The ram position desired for the slow, intermediate, fast and impact zones 32–35 is selected, and dialed into selectors 37–40. Then, the required speed for each particular zone 32–35 is selected in potentiometers 44–47. In the illustrated example, the ram positions are slow—20.0, intermediate—18.0, fast—13.25, and impact—0.625, and the ram speeds are slow—2, intermediate—7, fast—20, and impact—9.

Figure 4:
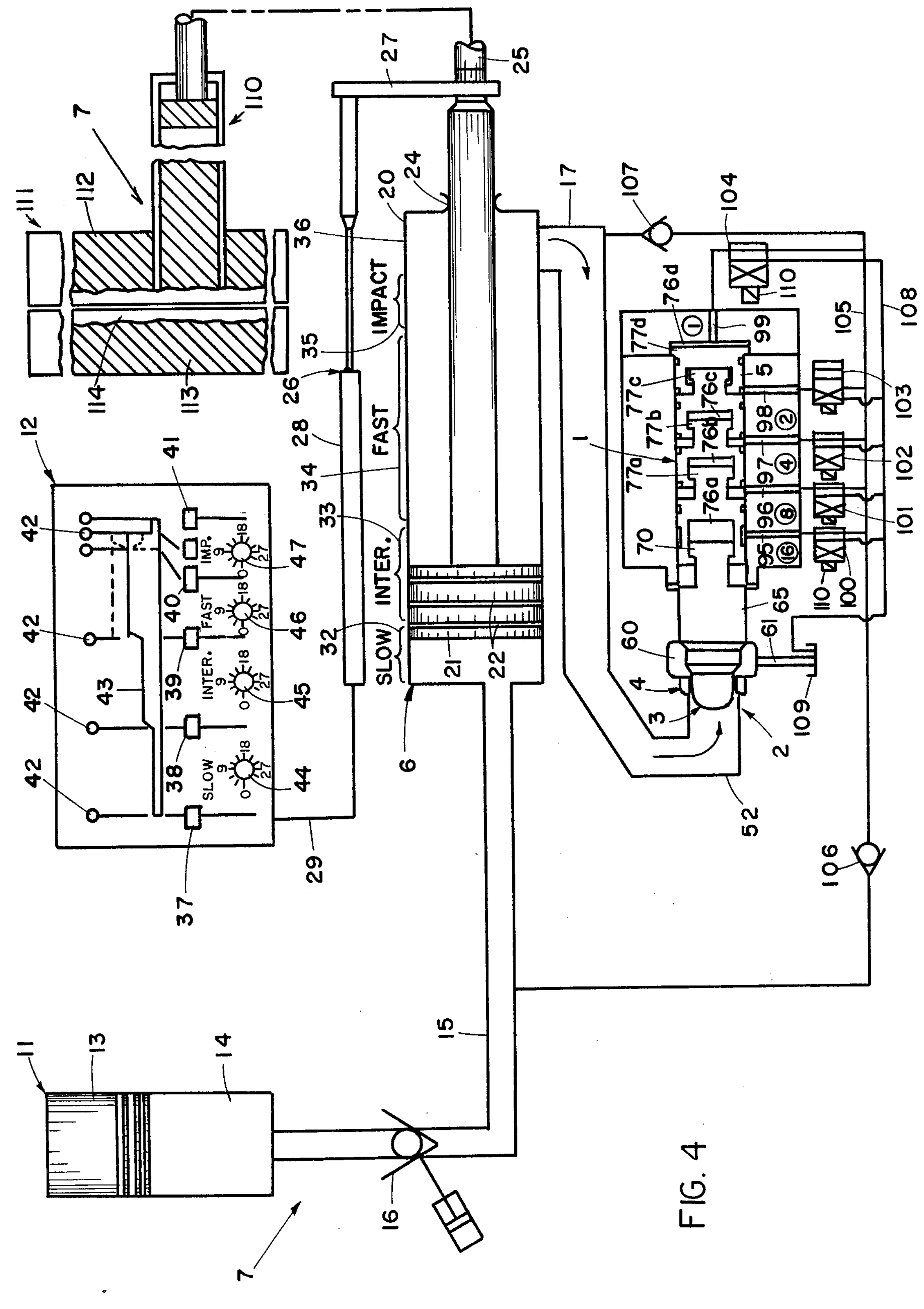
FIG. 4 is a partially schematic view of the valve and controller, shown attached to the shot cylinder of a die casting machine, which is in a partially extended, "slow" speed position.
Figure 5:
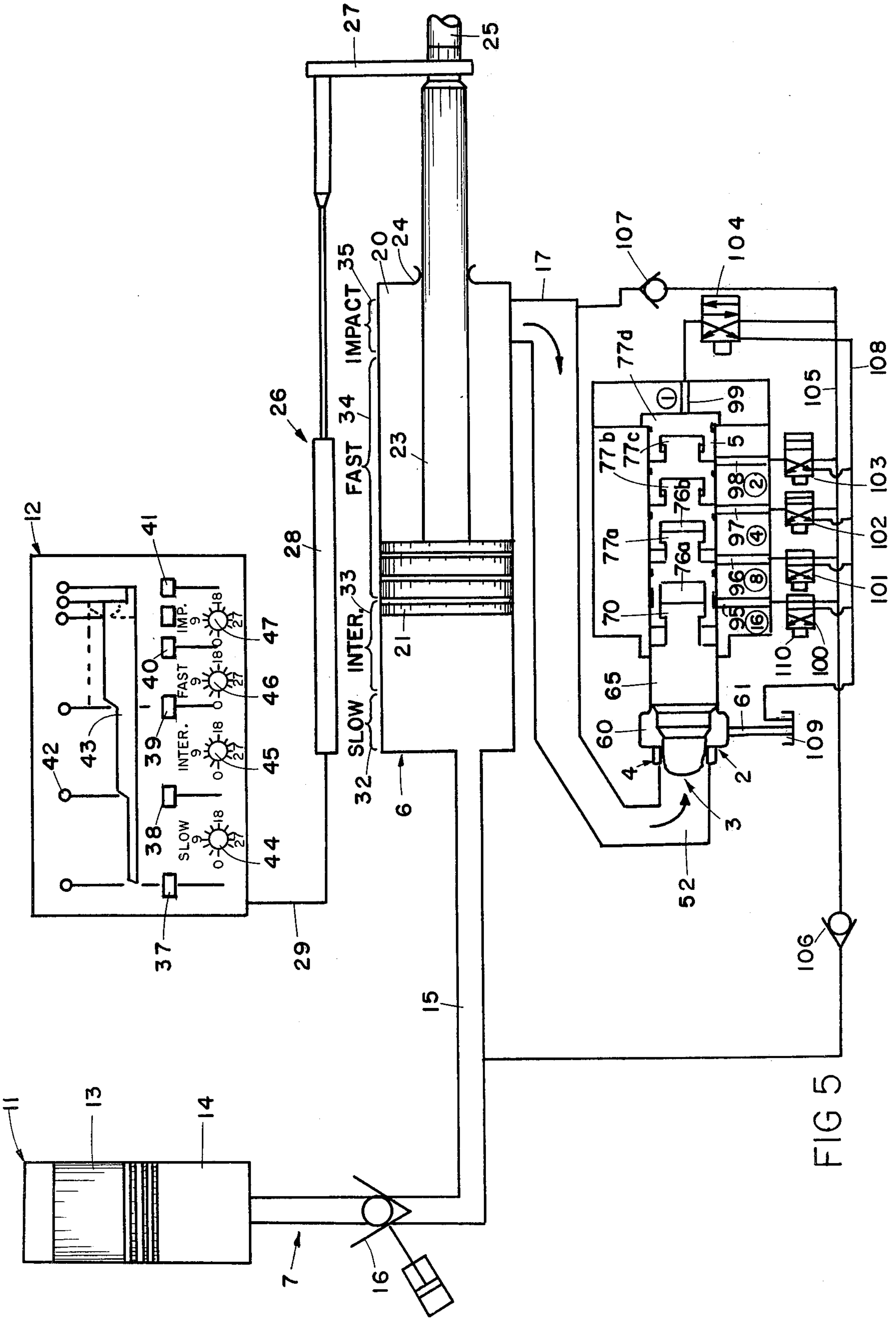
FIG. 5 is a partially schematic view of the valve and die casting machine illustrated in FIG. 4, with the shot cylinder shown in a further extended, "intermediate" speed position.

When shot piston 21 is fully retracted, transducer 28 signals speed selector 12 that the piston is positioned in slow zone 32, as shown in FIG. 4. A corresponding electrical signal is dispatched to the solenoids 110 of selected four-way valves 100–104, so that valve 2 is opened an amount corresponding to the speed set on potentiometer 44. Since the illustrated slow speed is set at "2", valve 103 is in the cross-over position, collapsing piston 77c, with the other valves in the through position, and their corresponding pistons extended. As shot piston 21 enters the intermediate zone (piston position 18.00–13.25), as shown in FIG. 5, transducer 28 signals this position to speed selector 12, which in turn shifts four-way valves 100–104 to achieve the intermediate speed set on potentiometer 45. In the illustrated example, the intermediate speed is set at "7", so that valves 102 and 104 are shifted to the cross-over position, thereby collapsing pistons *77b* and *77d*. Piston *77c* remains collapsed, so that in total, valve head 3 is longitudinally retracted from seat 4 a distance 3.5 greater than its slow-position of "2", and increases ram speed by 3.5 times.

It is to be noted that because the stroke lengths of actuators *5a–5d* have been selected in a 1-2-4-8-16 sequence, the speed selected on any one of potentiometers 44–47 can be achieved by closing those actuators which will cause the total of the stroke lengths of the collapsed pistons to correspond to the selected speed. For example, the actuator stroke lengths associated with the illustrated pistons are as follows: 1—*77d;* 2—*77c;* 4—*77b;* 8—*77a;* and 16—70. Thus to achieve the slow speed of "2", simply collapse piston 77c, the piston having a relative stroke length of "2". When the shot speed is increased to "7" in the intermediate zone 33, the pistons whose stroke length are "4" and "1" are also collapsed, which then added to previously collapsed "2" yields a total of "7".

Figure 6:
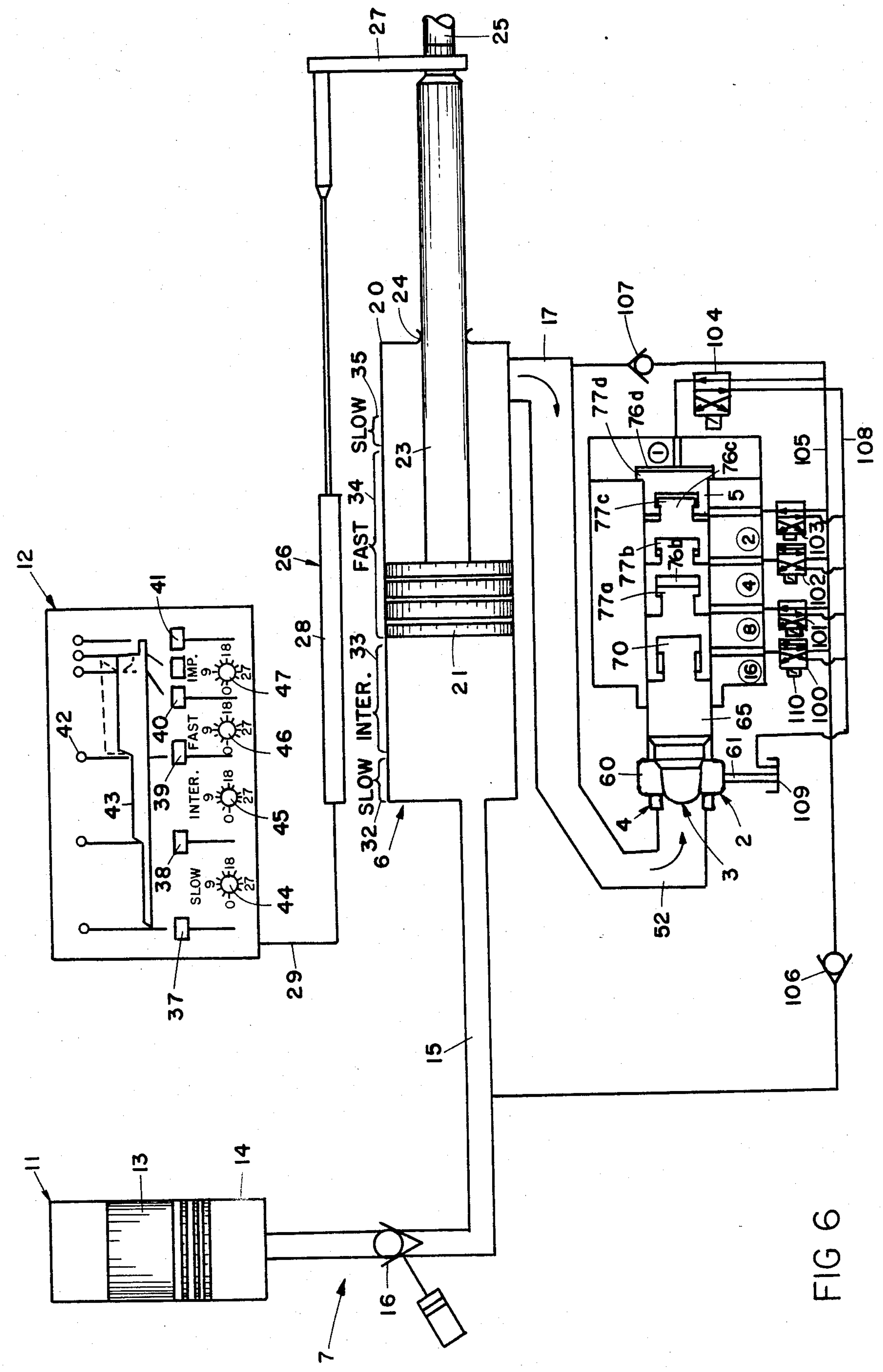
FIG. 6 is a partially schematic view of the valve and die casting machine illustrated in FIGS. 4 and 5, with the shot cylinder shown in an even further extended, "fast" speed position.
Figure 7:
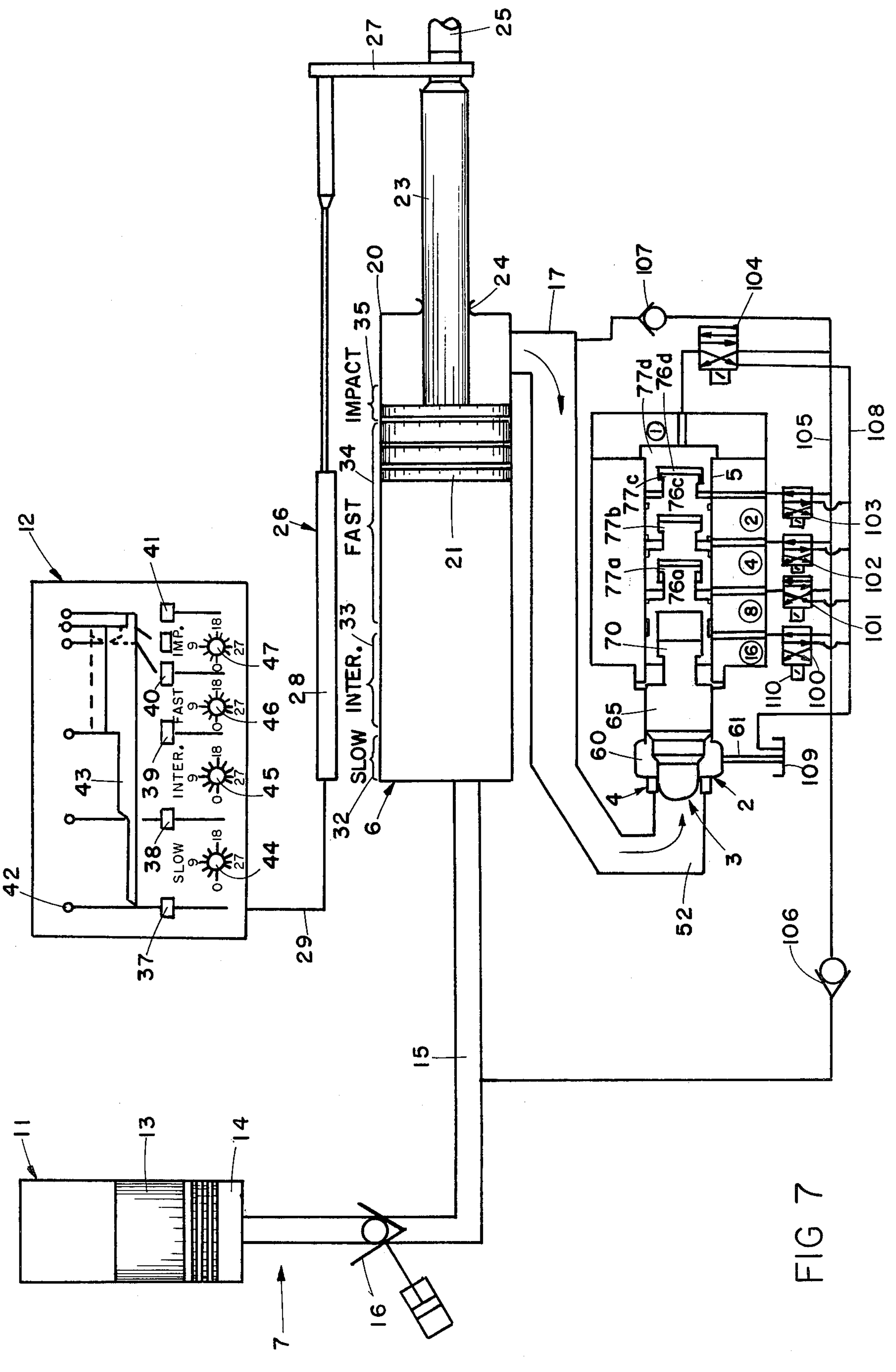
FIG. 7 is a partially schematic view of the valve and die casting machine illustrated in FIGS. 4–6, with the shot cylinder shown in a nearly fully extended, "impact" position.

When shot piston 21 enters the fast zone (between 13.25 and 0.625), as shown in FIG. 6, valves 103 and 104 are shifted to the through position to extend previously collapsed pistons 77c and 77d. Four-way valve 100 is shifted to the cross-over position, thereby collapsing piston 70. When shot piston in the shot piston 21 enters the impact zone (between 0.625 and 0.10), as shown in FIG. 7, valve 2 is closed quickly by shifting valves 100 and 103 to the through position, and valves 101 and 104 to the cross-over position, such that only piston 77a and 77d are collapsed. A conventional intensification step is used to fully compact the molten metal in the dye, and a follow-through step is used to eject any solidified metal from the injection nozzle.

The shot piston 21 is returned to the retracted position of FIG. 4 by well known conventional means (not shown) normally utilized in conventional die cast shot cylinder control systems. Such conventional and well known means include, for example, either a line leading from the outlet of accumulator 14 and having an electrically operated and controlled valve therein or an electrically operated and controlled pump connected to reservoir 109 and adapted to pump the hydraulic fluid from reservoir 109 into the exhaust side of the shot piston 21.

Controller 1 has a very sturdy, uncomplicated construction, and is capable of quickly and accurately moving valve 2 to control the speed of the shot cylinder. By providing each of the controller actuators with a different stroke length, a convenient binary valve arrangement results.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A molding machine having a die means in combination with a shot cylinder and a controller therefor, wherein:
   said shot cylinder comprises a housing having a shot piston mounted slidably therein for actuating a plunger for injecting a flowable material into said die, whereby translation of said shot piston in said housing controls the speed at which said die means associated with the die casting machine is injected with said flowable material;
   said controller comprising:
   a valve connected with one side of said shot cylinder, and including a body having a fluid passageway therethrough, and throttling means disposed in said passageway for restricting the flow of fluid therethrough;
   at least two, lineally extensible actuators interconnected in an end-to-end relationship, connected with said throttling means, and having means for independently extending and retracting each actuator, whereby selective manipulation of said actuators varies the position of said throttling means in said passageway and thereby controls extension of said shot piston, and thereby regulates the speed at which the flowable material is injected into said die means; and
   said throttling means being disposed at a free end of a valve stem, whereby fluid exhausted from said shot cylinder impinges on said throttling means and automatically retracts said actuators.

2. A shot cylinder controller as set forth in claim 1, wherein:
   said actuators are binary, wherein each actuator has only a fully extended position and a fully retracted position, with no intermediate operational positions therebetween.

3. A shot cylinder controller as set forth in claim 2, wherein:
   each of said actuators have a different stroke length.

4. A shot cylinder controller as set forth in claim 3, wherein:
   said actuator stroke lengths are proportioned with respect to each other in a $1^2$ sequence.

5. A shot cylinder controller as set forth in claim 4, wherein said actuators each comprise:
   a hydraulic cylinder having a piston telescoping in a housing valve means having a first position wherein pressurized fluid is introduced to a power side of said piston to extend the same, and a second position wherein the pressurized fluid is exhausted into a reservoir.

6. A shot cylinder controller as set forth in claim 5, wherein:
   said actuators are mounted in a substantial coaxial relationship.

7. A shot cylinder controller as set forth in claim 6, wherein:
   said throttling means is disposed generally axially in said passageway at a location upstream of said controller.

8. A shot cylinder controller as set forth in claim 7, wherein:
   said throttling means comprises a poppet-type valve having a seat in said housing and a valve head shaped for mating reception in said seat.

9. A shot cylinder controller as set forth in claim 8, wherein:

said valve seat and said valve head are shaped so that opening said valve head a given distance from a previous open position results in a proportionate increase in fluid flow through said valve.

10. A shot cylinder controller as set forth in claim 1, wherein:

each of said actuators has a different stroke length.

11. A shot cylinder controller as set forth in claim 10, wherein:

said actuator stroke lengths are proportioned with respect to each other in a $1^2$ sequence.

12. A shot cylinder controller as set forth in claim 1, wherein said actuators each comprise:

a hydraulic cylinder having a piston telescoping in a housing valve means having a first position wherein pressurized fluid is introduced to a power side of said piston to extend the same, and a second position wherein the pressurized fluid is exhausted into a reservoir.

13. A shot cylinder controller as set forth in claim 1, wherein:

said throttling means is disposed generally axially in said passageway at a location upstream of said controller.

14. A shot cylinder controller as set forth in claim 1, wherein:

said throttling means comprises a poppet-type valve having a seat in said valve body and a valve head shaped for mating reception in said seat.

15. A shot controller as set forth in claim 14, wherein:

said valve seat and said valve head are shaped so that opening said valve head a given distance from a previous open position results in a proportionate increase in fluid flow through said valve.

16. In a die casting machine having a hydraulic shot cylinder with an actuator rod connected with one side of a cylinder plunger which extends to inject molten metal into a die, the improvement of a control arrangement to control the injection into said die, comprising:

a control valve, comprising:

a valve body having a fluid passageway with an inlet and an outlet;

throttling means disposed in said passageway between said inlet and said outlet for restricting the flow of fluid through said passageway;

a valve controller connected with said throttling means and including at least two, lineally extensible actuators interconnected in an end-to-end relationship, and having means for independently extending and retracting each actuator, whereby selective manipulation of said actuators varies the position of said throttling means in said passageway and thereby controls fluid flow through said valve;

means for connecting said control valve with that end of said shot cylinder associated with the one side of said cylinder plunger, whereby hydraulic fluid exhausted from said shot cylinder during injection into said die flows through said control valve;

means for sensing the longitudinal position of said actuator rod with respect to said shot cylinder; and means for automatically shifting said actuators in response to the location of said actuator rod.

17. A machine as set forth in claim 16, wherein:

said actuators are binary, wherein each actuator has only a fully extended position and a fully retracted position, with no intermediate operational positions therebetween.

18. A machine as set forth in claim 17, wherein:

each of said actuators has a different stroke length.

19. A machine as set forth in claim 18, wherein:

said actuator stroke lengths are proportioned with respect to each other in a $1^2$ sequence.

20. A machine as set forth in claim 19, wherein said actuators each comprise:

a hydraulic cylinder having a piston telescoping in a housing, valve means having a first position wherein pressurized fluid is introduced to a power side of said piston to extend the same, and a second position wherein the pressurized fluid is exhausted to a reservoir, and means for retracting said piston.

21. A machine as set forth in claim 20, wherein said actuator extending and retracting means comprises:

a four-way valve for each of said actuators;

a high-pressure manifold communicating opposite ends of said shot cylinder with a pair of check valves disposed adjacent each end of said manifold, whereby maximum pressure is maintained in said manifold;

conduits communicating said high pressure manifold with an inlet port of each four-way valve;

an exhaust manifold communicating with a fluid reservoir; and conduits communicating said exhaust manifold with an outlet port of each four-way valve.

22. A machine as set forth in claim 21, wherein:

said throttling means comprises a poppet-type valve having a seat in said housing and a valve head shaped for mating reception in said seat.

23. A machine as set forth in claim 22, wherein:

said valve seat and said valve head are shaped so that opening said valve head a given distance from a previous open position results in a proportionate increase in die injection speed.

24. A controller for flow valves having a body with a fluid passageway therethrough, and throttling means disposed in said passageway for restricting the flow of fluid therethrough, said controller comprising:

at least two, lineally extensible actuators interconnected in an end-to-end relationship, adapted for connection with said throttling means, and having means for independently extending and retracting each actuator, whereby selective manipulation of said actuators varies the position of said throttling means in said passageway and thereby controls fluid flow through said valve; each of said actuators having a generally cylindrically-shaped body closely and coaxially received in a mating bore portion of said valve body, and including a U-shaped cavity at one end of said actuator, and a cylindrical plunger at the other end of said actuator; said actuator plunger being insertable into and closely received in the U-shaped cavity of an adjacent one of said actuators to operably interconnect said actuators, and form a hydraulically operated actuator cylinder therebetween.

25. A valve controller as set forth in claim 24, wherein:

said actuators are binary, wherein each actuator has only a fully extended position and a fully retracted position, with no intermediate operational positions therebetween.

26. A valve controller as set forth in claim 25, wherein:

each of said actuators has a different stroke length.

27. A valve controller as set forth in claim 26, wherein:

said actuator stroke lengths are proportioned with respect to each other in a $1^2$ sequence.

28. A valve controller as set forth in claim 27, wherein:

an upstreammost one of said actuators is adapted to carry said throttling means thereon; and said throttling means includes a free surface with a portion thereof disposed in said passageway perpendicular to the translational axis of said actuators, whereby fluid pressure acting on said throttling means free surface provides said actuator retracting means.

29. A valve controller as set forth in claim 28, wherein:

each U-shaped body cavity of said actuators is shaped to mate with a fluid port for pressurizing and exhausting said actuator cylinders.

30. A valve controller as set forth in claim 29, wherein:

each actuator body includes a peripheral groove with a seal mounted therein to form a sliding seal with the valve body wall defining said mating bore.

31. A valve controller as set forth in claim 24, wherein:

each of said actuators has a different stroke length.

32. An injection molding machine having a die and a hydraulic shot cylinder providing the motive force for injecting flowable material into said die, the improvement of a control valve means connected with one side of said shot cylinder for controlling extension of a ram portion of said shot cylinder, comprising:

a valve body having a fluid passageway with an inlet and an outlet;

throttling means disposed in said passageway between said inlet and said outlet for restricting the flow of fluid through said passageway;

a valve controller connected with said throttling means and including at least two, lineally extensible actuators interconnected in an end-to-end relationship, and having means for independently extending and retracting each actuator, whereby selective manipulation of said actuator varies the position of said throttling means in said passageway and thereby controls fluid flow through said valve, and wherein said valve means comprises:

a four-way valve for each of said actuators;

a high-pressure manifold communicating with each side of said shot cylinder on either side of said shot piston with a pair of check valves disposed adjacent each end of said manifold, whereby maximum pressure is maintained in said manifold;

conduits communicating said high pressure manifold with an inlet port of each four-way valve;

an exhaust manifold communicating with a fluid reserovir; and conduits communicating said exhaust manifold with an outlet port of each four-way valve.

33. A machine as set forth in claim 32, including:

means for sensing the position of a rod portion of said shot cylinder; and means for automatically shifting said four-way valves in response to the location of said shot rod.

34. A machine as set forth in claim 33, wherein:

said throttling means comprises a poppet-type valve having a seat in said housing and a valve head shaped for mating reception in said seat.

35. A machine as set forth in claim 34, wherein:

said valve seat and said valve head are shaped so that opening said valve head a given distance from a previous open position results in a proportionate increase in die injection speed.

* * * * *